United States Patent
Weigel et al.

[11] Patent Number: 6,113,842
[45] Date of Patent: *Sep. 5, 2000

[54] METHOD OF MAKING BLOWN FILMS OF CELLULOSE

[75] Inventors: Peter Weigel, Kleinmachnow; Hans-Peters Fink, Teltow; Konrad Frigge, Potsdam; Wolfgang Schwarz, Kleinmachnow, all of Germany

[73] Assignee: Fraunhofer-Gesellschaft Zur Forderung Der Angewandten Forschung E. V., Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/765,025
[22] PCT Filed: Jun. 19, 1995
[86] PCT No.: PCT/DE95/00811
 § 371 Date: Feb. 28, 1997
 § 102(e) Date: Feb. 28, 1997
[87] PCT Pub. No.: WO95/35340
 PCT Pub. Date: Dec. 28, 1995

[30] Foreign Application Priority Data

Jun. 20, 1994 [DE] Germany ............... 44 21 482

[51] Int. Cl.⁷ .................. B29C 47/88; B29C 49/04
[52] U.S. Cl. ............ 264/559; 264/561; 264/562; 264/564; 264/209.5; 264/211.11; 264/211.19
[58] Field of Search ............... 264/558, 559, 264/561, 563, 564, 178 R, 209.5, 211.11, 211.12, 211.13, 211.19, 176.1, 209.4, 557, 562

[56] References Cited

U.S. PATENT DOCUMENTS

| | | |
|---|---|---|
| 4,416,698 | 11/1983 | McCorsley, III . |
| 5,451,364 | 9/1995 | Ducharme, Jr. et al. ............... 264/559 |

FOREIGN PATENT DOCUMENTS

| | | |
|---|---|---|
| 494851 | 1/1992 | European Pat. Off. . |
| 0574870 | 6/1993 | European Pat. Off. . |
| 9313670 | 7/1993 | WIPO . |
| 9319230 | 9/1993 | WIPO . |
| 9507811 | 3/1995 | WIPO . |

OTHER PUBLICATIONS

"Kunststoff–Lexikon", 7th edition, Cals Hanser Verlag Munich, Vienna 1981, pp. 454–455.

*Primary Examiner*—Jan H. Silbaugh
*Assistant Examiner*—Kenneth M. Jones
*Attorney, Agent, or Firm*—Young & Basile, P.C.

[57] ABSTRACT

The invention is directed to a method of manufacturing oriented cellulose films by spinning non-derivated cellulose dissolved in amino oxides into a precipitating bath. The cellulose solution is extruded downward through a film-blowing nozzle and an external air gap into the precipitating bath. The spun cellulose film can be inflated after exiting the film-blowing nozzle.

12 Claims, No Drawings

METHOD OF MAKING BLOWN FILMS OF CELLULOSE

BACKGROUND OF THE INVENTION

The invention relates to a method for manufacturing oriented cellulose films by extruding a cellulose solution in a regenerating bath, to films manufactured according to the method, and their utilisation.

At present large number of products are being made world-wide from regenerated cellulose, such as fibres, films and other shaped bodies, predominantly by the viscose method. The viscose method however is disadvantageous because of the high degree of environmental stress and the high investment costs involved.

Proceeding from this point many efforts are being made to propose alternative methods. As regards the generation of cellulose fibres, a promising method is the spinning of solutions of cellulose in amino oxides. From DE 28 30 605, DD 142 000 and U.S. Pat. No. 3,767,756 is it known that cellulose is soluble in a N-methyl-morpholin-N-oxide (NMMNO)-water system, and can be processed to produce textile fibres by spinning in a normally aqueous NMMO solution. The composition of solutions and regenerating bath is further known from DD 201 703. In the abovenamed publication it is also disclosed that additives can be added to the regenerating bath.

SUMMARY OF THE INVENTION

The manufacture of cellulose blown films from NMMO solutions however has not previously been known in prior art.

Proceeding from this prior art it is the object of the present invention to indicate a method for manufacturing cellulose films, and the films themselves, and in which in particular the mechanical properties of the films are to be adjustable.

DESCRIPTION OF THE PREFERRED EMBODIMENT

Surprisingly, the applicant was able to show for the first time that it is possible to obtain cellulose blown films when cellulose dissolved in amino oxide is extruded downwards into a regenerating bath through a film blower nozzle and an external air gap. The method according to the invention is characterised in particular in that it is possible by varying the parameters of the method to produce variously-oriented blown films. On the one hand, by varying the draw ratio and blow-up ratio, the longitudinal and cross stretch ratios can be adjusted. In this respect the draw and blow-up ratios can be varied within a range from 1 to 10. The films produced thereby then either have a unipolar-axial, a biaxial or a unipolar-biaxial orientation. A factor which is particularly surprising and could not have been foreseen is that the cellulose films can also have a uniplanar-biaxial orientation, the (101)-interplanar group (Meyer/Misch nomenclature) to the film surface and the chain axes being present to a varying degree, preferably oriented in the film's direction of travel and transversely thereto. The method according to the invention is further characterised in that an additional control of the mechanical properties is also possible by means of variation of the external air gap. The external air gap can in this case be varied within a range of 1 to 5 mm.

Tests have shown that with a maximum draw ratio of 5 and a blow ratio of 1, preferably weakly oriented uniplanar-axial structures result. By definition known in the art, the draw ratio is the ratio of the linear velocity of the tube being pulled through the precipitating bath and the linear velocity of the solution exiting the film-blower nozzle. By definition known in the art, the blow up ratio is the ratio between the circumference or diameter of the performed tube at the film-blower nozzle and the circumference or diameter of the blown-up tube. Since the circumference and diameter are proportional to each other, thus the ratio is the same.

When the air gap is set to more that 5 mm, uniplanar-biaxially oriented films are obtained, whose degree of orientation can be increased by increasing the withdrawal and cross stretch ratio.

Accordingly the method according to the invention is particularly characterised in that the mechanical properties of the blown films which can be produced can be altered both by varying the longitudinal and cross stretch in the air gap, and additionally by varying the length of the air gap. Thus the mechanical properties of the manufacturable films can be influenced in a controlled manner, both isotropic and anisotropic films, i.e. films can be produced with different parameters of mechanical properties in the transverse and in the longitudinal directions.

The conventional procedure in blown film manufacture of inflating the film tube with air as described for example in DE 38 15 415, is surprisingly also possible when producing blown films from cellulose dissolved in amino oxides.

Another embodiment of the invention proposes that the film tube be inflated, not with air but with the regenerating bath liquor. According to the invention, in this design it is to be ensured that an internal air gap between the film-blower nozzle and the regenerating bath is also present inside the film tube. This internal air gap may in this case be varied in a range between 0.1 and 50 mm. This enables further control of the coagulation process, as it is possible to set different lengths of air gap inside and outside the film tube. The internal air gap is preferably set at 0.1 to 30 mm.

This method at the same time also prevents adhesion of the films when folded, which is easily possible when only air is introduced into the film tube. The length of the air gap and the pressure required to set the cross stretch ratio can be regulated by means of the quantity of liquid introduced and the pressure in the air gap. Thus the setting of different biaxially-oriented structures may be directly controlled.

A further means of affecting the coagulation behaviour can be produced in that different regenerating baths (different concentrations of the NMMO, additives such as isopropanol, aminopropanol, urea, Caprolactam, among others) are used inside and outside the film tube.

Additives to regenerating baths are also disclosed in DD 201 703. The invention also includes all these additives. By means of the varying coagulation procedure on the interior and the exterior of the film which is thus caused, it is also possible to produce asymmetrical films. The method according to the invention as described above is preferably realised by means of a downwardly-directed annular nozzle as a film blower nozzle. The annular nozzle may therefore have a diameter of 10 to 200 mm. It is further preferred that a non-derivated cellulose is used, dissolved in N-methyl-morpholin-N-oxide (NMMO).

The invention further relates to the films produced by means of the method. The films are particularly characterised in that they have a strength in the range of 100 to 600 Mpa. As already stated above, it is particularly preferred in the films produced according to the invention that their orientation should be settable as uniplanar-axial, biaxial or uniplanar-biaxial.

Finally, the invention relates also to utilisation of the films described above, as biodegradable and combustible material with a wide field of application, e.g. s packaging material.

The invention will be described in more detail in the following with reference to three embodiments given by way of example.

EXAMPLES

1. A solution of 9.5% cellulose in NMMO monohydrate with 0.1% by mass, relative to cellulose propyl gallate as a stabiliser, was extruded downwards with a laboratory extruder through a film blower nozzle with a diameter of 25 at a temperature of 90° C., through an external air gap 3 mm wide with a draw ratio of 1:5 and a cross stretch ratio of 1:1 into a regenerating bath comprising a 10% aqueous NMMO solution. The interior of the resultant film tube is completely filled with the same regenerating bath liquor. The film tube as folded while still in the regenerating bath, removed from the regenerating bath over a deflecting roller, washed and dried. The resultant film has the following parameters:

| Film thickness: | 65 μm |
|---|---|
| strength, | |
| longitudinal strength traverse: | 198 Mpa |
| | 96 Mpa |
| Elongation at tear, | |
| longitudinal: | 14% |
| transverse: | 34% |
| E-module, | |
| longitudinal: | 7200 Mpa |
| transverse: | 1360 Mpa |

Parameters of orientation determined by X-ray: see Table 1.

2. As Example 1 with an external air gap 5 mm wide and an air gap inside the film tube 8 mm wide.

The resultant film has the following parameters:

| Film thickness: | 58 μm |
|---|---|
| strength, | |
| longitudinal: | 258 Mpa |
| transverse: | 110 Mpa |
| Elongation at tear, | |
| longitudinal: | 12% |
| transverse: | 28% |
| E-module, | |
| longitudinal: | 7800 Mpa |

Parameters of orientation determined by X-ray: see Table 1.

3. As Example 1 with a draft in the longitudinal direction of 1:5 and a blow-up ratio of 1:2.5. The resultant film has the following parameters:

| Film thickness: | 25 μm |
|---|---|
| strength, | |
| longitudinal: | 330 Mpa |
| transverse: | 190 Mpa |
| Elongation at tear, | |
| longitudinal: | 10% |
| transverse: | 18% |

| E-module, | |
|---|---|
| longitudinal: | 12360 Mpa |
| transverse: | 3080 Mpa |

Parameters of orientation determined by X-ray: see Table 1.

Determination of the orientation from X-ray photographs in vertical transmission.

TABLE 1

| Example, Orientation Type. Reflexes/Shot Geometry | | | | |
|---|---|---|---|---|
| | (101)/b | (101)/c | (101)/a | (101)b |
| 1. uniplanar-axial | g | g | g | sg |
| 2. uniplanar-biaxial | h | g | m | g |
| 3. distinctively uniplanar-biaxial | sh | m | h | m |

Shot Geometry:
a. Vertically to the film surface
b. Parallel to the film surface, vertical to the direction of travel.
c. Parallel to the film surface, parallel to the direction of travel.

Elevation of the azimuthal reflex sharpness as a relative measure of orientation:

sg = very slight, almost annular reflex
g = slight
m = medium
h = high
sh = very high

What is claimed is:

1. A method of manufacturing oriented cellulose films by spinning non-derivated cellulose dissolved in amino oxides in external and internal precipitating bathe, comprising the steps of:
    extruding a cellulose solution downwards through a film-blower nozzle and an external air gap as a film tube into the precipitating bath, said air gap consisting of an open space between the film blower nozzle and the precipitating bath, and continuously inflating the film tube by a gas pressure enclosed in an internal air gap between the film-blower nozzle and the extruded film tube before the film tube reaches the internal precipitating bath,
    wherein said nozzle is located above the internal precipitating bath and the internal air gap is defined by an space between the film blower nozzle and the internal precipitating bath and said internal air gap is between 0.1 and 30 mm.

2. The method according to claim 1, further including the step of:
    setting the film into one of a uniplanar-axial, biaxial and uniplanar-biaxial orientation,
    by drawing the film tube and varying the draw ratio in a range between 1 and 10 and varying the blow-up ratio in a range between 1 and 10.

3. The method according to claim 1 further including the step of:

setting the film into one of a uniplanar-axial, biaxial and uniplanar-biaxial orientation, by means of varying the length of the external air gap in a range between 1 and 50 mm.

4. The method according to claim 3 wherein the length of the external gap is 1.0 to 5.0 mm.

5. The method according to claim 1, wherein the film tube is inflated by air.

6. The method according to claim 1 wherein one of water and an aqueous solution of NMMO is used as a regenerating bath.

7. The method according to claim 6 wherein by means of adding one of another organic and inorganic materials, an alteration is caused in the composition of the regenerating bath liquor in at least one of the inside and outside of the film tube, whereby the structure of the film is affected.

8. The method according to claim 1 wherein asymmetry in the film may be produced by different cmposition of the regenerating baths which are located inside and outside the film tube.

9. A method of manufacturing oriented cellulose films by spinning non-derivated cellulose dissolved in amino oxides in a precipitating bath, comprising the steps of:

extruding a cellulose solution downward through a film blower nozzle and an external air gap as a film tube into the precipitating bath, said air gap consisting of an open space between the film blower nozzle and the precipitating bath, inflating the film tube by a liquid introduced into the interior of the film tube and providing an internal air gap inside the film tube between the surface of the liquid and the film blower nozzle, wherein the film tube is continuously inflated by the pressure in the air enclosed in the air gap, wherein said nozzle is located above the internal precipitating bath and the internal air gap is defined by an space between the film blower nozzle and the internal precipitating bath and said internal air gap is between 0.1 and 30 mm.

10. The method according to claim 9 further including the step of setting the film into one of a uniplanar-axial, biaxial, and uniplanar-biaxial orientation by varying the length of the external air gap in a range of 0.1 and 5.0 mm; and setting a coagulation procedure by varying the length of the internal air gap in a range between 0.1 and 30 mm.

11. A method of manufacturing oriented cellulose films by spinning non-derivated cellulose dissolved in a solution comprising amino oxides in an external precipitating bath and an internal precipitating bath comprising the steps of:

extruding the non-derivated cellulose solution downwards through a film blower nozzle and through internal and external air gaps as a film tube into said precipitating baths, continuously inflating the film tube by a gas pressure enclosed within the internal air gap, and wherein said internal air gap is located between said film blower nozzle and said internal precipitating bath and said internal air gap consists of pressurized air.

12. A method of manufacturing an oriented cellulose film tube comprising the steps of:

forming a solution of non-derivated cellulose by dissolving non-derivated cellulose in a solvent comprising an amine oxide, extruding said solution of non-derivated cellulose downwards through a film blower nozzle downwards into a precipitating bath comprising an external precipitating bath and an internal precipitating bath and through an external air gap, and inflating the film tube by a liquid pressure of said internal precipitating bath enclosed within and completely filling said extruded film tube.

* * * * *